(12) United States Patent
Emmelmann et al.

(10) Patent No.: US 6,508,576 B2
(45) Date of Patent: Jan. 21, 2003

(54) ILLUMINATION DEVICE, IN PARTICULAR LIGHT FOR MOTOR VEHICLE

(75) Inventors: Silke Emmelmann, Reutlingen (DE); Michael Hamm, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/850,867

(22) Filed: May 8, 2001

(65) Prior Publication Data

US 2001/0048601 A1 Dec. 6, 2001

(30) Foreign Application Priority Data

May 9, 2000 (DE) ......................... 100 22 420

(51) Int. Cl.$^7$ ................................. B60Q 3/04
(52) U.S. Cl. .................. 362/543; 362/544; 362/545; 362/27; 362/228
(58) Field of Search ................. 362/543, 544, 362/545, 27, 228

(56) References Cited

U.S. PATENT DOCUMENTS 5,479,275 A * 12/1995 Abileah ......................... 349/5

FOREIGN PATENT DOCUMENTS

| DE | 197 40 317 C1 | 2/1999 |
| DE | 198 33 475 C2 | 6/2000 |

* cited by examiner

Primary Examiner—Sandra O'Shea
Assistant Examiner—Bertrand Zeade
(74) Attorney, Agent, or Firm—Michael J. Striker

(57) ABSTRACT

An illumination device formed as a light for a motor vehicle has at least one light emitting element which emits light producing an illumination intensity distribution, and at least one additional light source which emits a light supporting the production of higher illumination intensity value in at least one partial region of an illumination intensity distribution produced by the light exiting the illumination device.

11 Claims, 3 Drawing Sheets

ILLUMINATION DEVICE, IN PARTICULAR LIGHT FOR MOTOR VEHICLE

BACKGROUND OF THE INVENTION

The present invention relates to an illumination device, in particular a light for a motor vehicle.

One of such illumination devices is disclosed for example in the German patent document DE 198 83 475 A1. This illumination device has an elongated light emitting element formed as a neon tube. Light is emitted from the light emitting element through its longitudinal extension from at least a part. The German patent document DE 197 40 317 A1 also discloses an illumination device which has an elongated light emitting element formed as a light guide, from which light is emitted over its longitudinal extension in a distributed manner from at least one part of its periphery. In these known illumination devices, because of the elongated light emitting element, the emitted light produces a uniform illumination distribution without a pronounced maximum of the illumination intensity. The production of higher illumination intensity values in at least one region of the illumination intensity distribution is however not possible. The illumination intensity distribution produced by the illumination device is dictated by its operation. For example, for front blinking lights it is prescribed that light which is emitted by it must have an illumination intensity distribution with a pronounced maximum illumination intensity in its center. This can not be achieved in the illumination devices formed in accordance with the prior art.

SUMMARY OF THE INVENTION

Accordingly, it is an object of present invention to provide an illumination device which avoids the disadvantages of the prior art.

In keeping with these objects and with others which will become apparent hereinafter, one feature of the present invention resides, briefly stated, in an illumination device which has at least one light emitting element which emits light producing an illumination intensity distribution; and at least one additional light source which emits a light supporting the production of higher illumination intensity value in at least one partial region of an illumination intensity distribution produced by the light exiting the illumination device.

When the illumination device is designed in accordance with the present invention, it has the advantage that with the use of one additional light source, high illumination intensity value is provided in the illumination intensity distribution produced by the light emitted by the illumination device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

FIGS. 1–9 show an illumination device for a motor vehicle, which is used in particular as a light and for example as a front blinking light on the motor vehicle. The illumination device can be arranged at the rear of the motor vehicle. The illumination device can have a housing 10 which has a light outlet opening covered by a light-permeable member or disk 12. The cover disk 12 can be colored in corresponding signal colors of the illumination device, for example in orange color when it is used as a blinking light, or it can be colorless. Depending on the use of the illumination device, an illumination intensity distribution is provided, which must be produced by the light emitted by it. For a plurality of measuring points, illumination intensity values are provided which must there be at least available.

Figure 1:
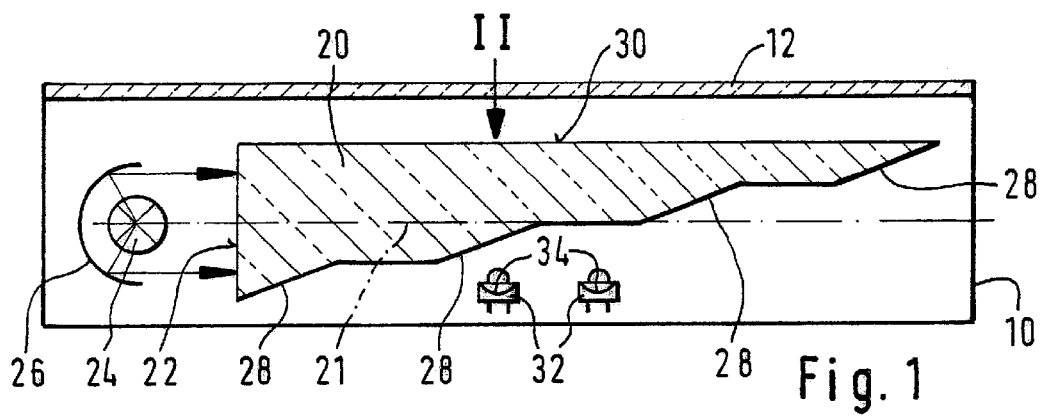
FIG. 1 is a view showing an illumination device in a simplified schematic representation in a horizontal longitudinal section in accordance with a first embodiment of the present invention.
Figure 2:
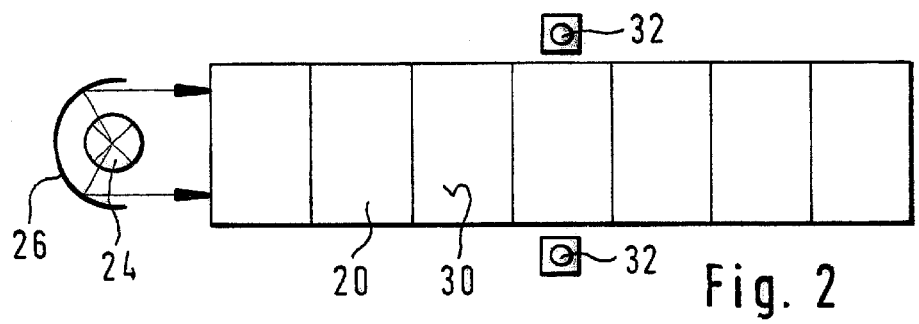
FIG. 2 is a view showing an illumination device in accordance with the first embodiment, on a front view as seen in direction of the arrow II in FIG. 1.

FIGS. 1 and 2 show the illumination device in accordance with a first embodiment of the present invention. The illumination device has an elongated light emitting element 20, which is formed as a light guide. The longitudinal extension of the light element 20 therefore corresponds for example horizontally to the shape of the illumination device. The illumination device which operates as a front blinking light can be arranged for example above or below a headlight provided at the front side of the motor vehicle. In a vertical direction the extension of the light element 20 is smaller than in a horizontal direction. The light guide can have a substantially rectangular cross-section as shown for example in FIG. 2. The light guide 20 at an end side is provided with a light inlet surface 22. It is arranged substantially perpendicular to the longitudinal axis 21 of the light guide 20 and supplies light in the light guide 20.

At least one light source 24 is arranged opposite to the light inlet surface 22 of the light guide 20. It can be formed as an incandescent lamp, in particular a halogen-incandescent lamp, or as a gas discharge lamp. A reflector 26 is associated with the light source 24 and reflects the light emitted by the light source so as to orient it to the light inlet surface 22 of the light guide 20. The light supplied in the light guide 20 is further guided along its longitudinal axis 21. A plurality of light decoupling portions 28 are provided over the longitudinal extension in a distributed manner on a longitudinal side of the light guide 20. The light decoupling portions 28 are inclined to the longitudinal axis 21, so that the cross section of the light guide 20 is reduced away from the light inlet surface 22. The longitudinal side of the light guide 20 which is opposite to the light decoupling portions 28 extends at least approximately parallel to its longitudinal axis 21 and forms a light outlet surface 30. The light outlet surface 30 of the light guide 20 can be formed substantially flat or curved.

When the light which is supplied into the light guide 20 falls on one of the light coupling portions 28, this part of the light is deviated by the inclined arrangement of the light decoupling portion 26 and extends outwardly through the opposite light outlet surface 30 of the light guide 20. FIG. 2 shows the light guide 20 in the front view on each light outlet surface 30. The light decoupling portions 28 and the opposite longitudinal side are shown by broken lines. The light decouples in a dispersed manner on the light decoupling portions 28, so that light from the light outlet surface 30 of the light guide 20 exits over its longitudinal extension uniformly.

Light the light guide 20 produces an illumination intensity distribution which has no pronounced maximum of the illumination intensity and in which the illumination intensity reduces to its edges. In the illumination device at least one additional light source 32 is provided which emits the light used for producing high illumination intensity values in at least one partial region of the illumination intensity distribution of the light produced by the illumination device. In the first embodiment shown in FIGS. 1 and 2, the illumination device has for example two additional light sources 32, with one light source 32 located above and the other light source located below the light guide 20. Also, more additional light sources 32 can be arranged near one another or one above the other. The light emitted by the additional light sources 32 does not pass through the light guide 20.

The additional light sources 32 are formed at least approximately punctual and also are formed as semiconductor light sources, in particular as light diodes. At least approximately punctual design of the additional light sources 32 can be seen in particular when compared with the extension of the light guide 20 which is substantially greater. The additional light sources 32 are each associated with a reflector 34, by which the light emitted by the light sources is reflected. The light emitted by the additional light sources extends, similarly to the light emitted by the light guide 20, through the cover disk 12 of the illumination device. Alternatively, or additionally to the reflectors 34, the additional light sources can be associated with a not shown lense, through which the light emitted by them can pass.

The cover disk 12 can be formed smooth, so that the light can pass through it substantially without being influenced. Alternatively, the cover disk 12 can be provided at least locally with optical profiles, by which the light emitted by the light guide 20 and/or the additional light sources 32 can be deviated or dispersed during passage.

Figure 3:
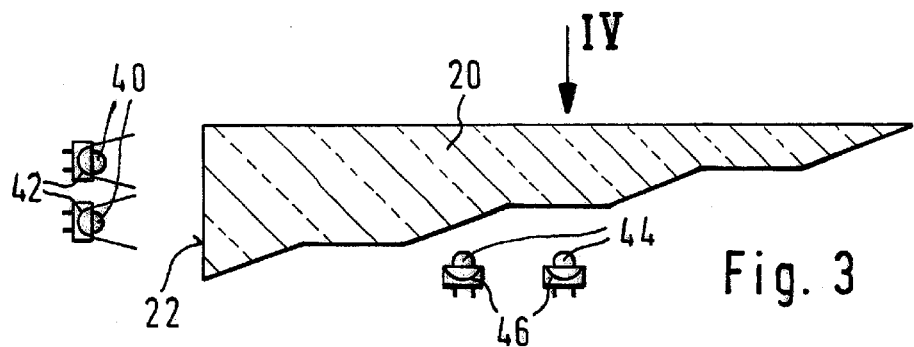
FIG. 3 is a view showing an illumination device in a horizontal longitudinal section, in accordance with a second embodiment.
Figure 4:
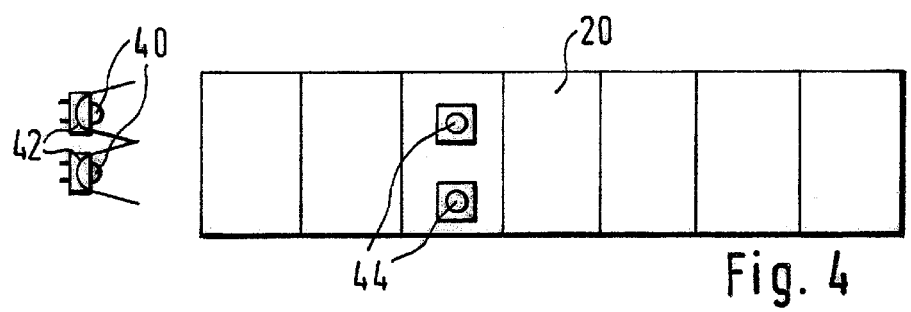
FIG. 4 is a view showing an illumination device in accordance with the second embodiment in a front view as seen in direction of arrow IV in FIG. 3.

The illumination device in accordance with a second embodiment is shown in FIGS. 3 and 4. The illumination device in accordance with the second embodiment is different from that of the first embodiment, in that one or several semiconductor light sources 40, in particular light diodes are utilized as light sources for coupling of light in the light guide 20. Reflectors 42 can be associated with light diodes 40 for reflecting the light emitted by the light diodes and orienting it to the light inlet surface 22 of the light guide 20. Alternatively with or additionally to reflectors 42, one or several lenses can be associated with light sources 40. The design of the light guide element 20 is the same as in the first embodiment. At least one additional, at least approximately punctual light source 45 which is formed for example as a semiconductor light source, in particular as a light diode, is provided here for the same purpose as in the first embodiment. For example, two additional light sources 44 can be provided, which are arranged behind the light guide 20, so that the light emitted by the light sources 42 passes through the light guide 20.

A reflector 46 can be associated with each of the additional light sources 44. The additional light sources can be offset relative to the light guide 20 as the additional light sources 32 in the first embodiment, so that the light emitted by them does not pass through the light guide 20. Similarly to the illumination device of the first embodiment, here the additional light sources 32 are arranged behind the light guide 20, and the light emitted by them passes through the light guide 20. It can be also provided that one or several additional light sources 44 or 32 are arranged behind the light guide 20, so that light emitted by them passes through the light guide 20, and one or several additional light sources 44 and 42 are offset relative to the light guide 20 so that the light emitted by them exits directly.

Figure 5:
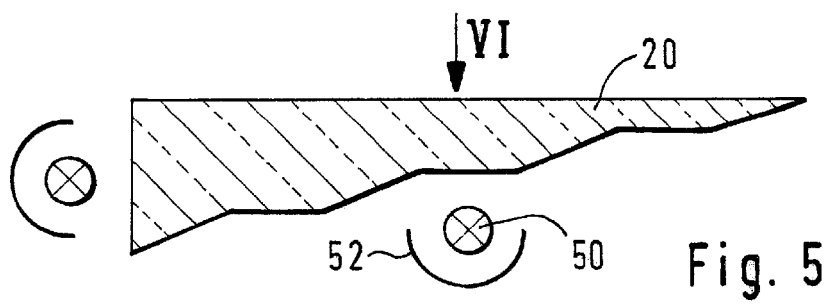
FIG. 5 is a view showing an illumination device in a horizontal longitudinal section in accordance with a third embodiment of the present invention.
Figure 6:
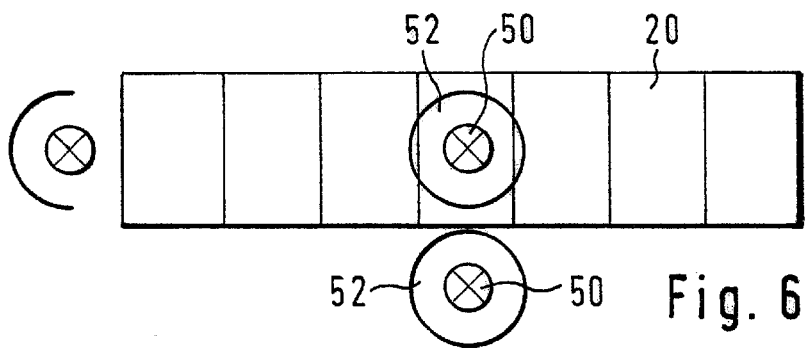
FIG. 6 is a view showing an illumination device in accordance with the third embodiment of the present invention, on a front view as seen in direction of the arrow VI in FIG. 5.

The illumination device in accordance with a third embodiment is shown in FIGS. 5 and 6. The basic construction of this embodiment is the same as in the first embodiment. The illumination device in accordance with a third embodiment has at least one additional light source provided for the same purpose as in the first embodiment which, when compared to the extension of the light guide 20, is at least approximately punctual. For example, two additional light sources 50 can be provided which can be formed as small incandescent lamps having a low electrical power consumption. The power consumption of the incandescent lamps 50 can be for example 2–5 watt. The reflectors 52 can be associated with the additional light sources 50, with which the light emitted by the light sources is reflected. The light emitted by the additional light sources 50 is used for producing at least one pronounced maximum of the illumination intensity of the illumination intensity distribution produced by the whole light emitted by the illumination device. The additional light sources 50 can be offset relative to the light guide 20 above or below, or can be arranged behind the light guide 20.

Figure 7:
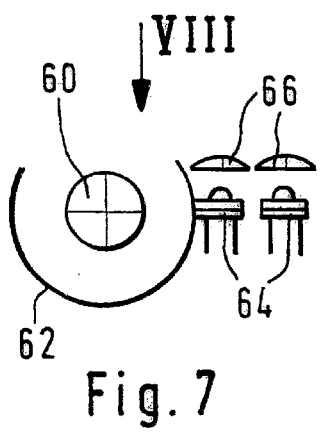
FIG. 7 is a view showing an illumination device in a cross-section in accordance with a fourth embodiment of the present invention.
Figure 8:
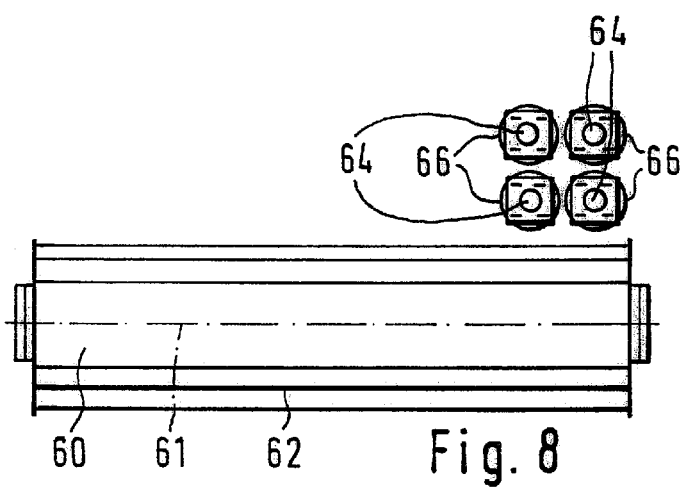
FIG. 8 is a view showing an illumination device in accordance with the fourth embodiment of the present invention, on a front view as seen in direction of the arrow VIII in FIG. 7.

The illumination device in accordance with the fourth embodiment is shown in FIGS. 7 and 8. The illumination device has an elongated light emitting element 60 which is formed as a light source. The light source 60 is preferably a discharge tube, in particular a neon tube. The light source 60 is formed for example at least approximately cylindrical. Its extension in direction of the longitudinal axis 61 is significantly greater than in a radial direction to the longitudinal axis 61. The light source 60 is surrounded over a part of its periphery by a reflector 62 which is also formed approximately cylindrical in correspondence with the shape of the light source 60. Light emitted by the light source 60 is distributed over the longitudinal extension from its periphery, is at least partially reflected by the reflector 62, and passes through the cover disk 12 outwardly over the illumination device. The light which is emitted by the light source 60 and reflected by the reflector 62 produces an illumination intensity distribution which has no pronounced maximum of the illumination intensity and the illumination intensity reduces to its edges.

In the illumination device at least one additional light source 64 is provided, which when compared with a longitudinally extending light source 60, is at least approximately punctual. The light emitted by the at least one additional light source 64 is used for producing high illumination intensity values in at least one partial region in the illumination intensity distribution produced by the whole light emitted by the light illumination device. The at least one additional light source 64, as in the previous embodiments, can be formed as a light diode which can be associated with a reflector or not, or as a small incandescent lamp with an associated reflector. The at least one additional light source 64 is offset relative to the light source 60 and the reflector 62, so that the light emitted from it can pass through the cover disk 12 outwardly over the illumination device. In the fourth embodiment, for example four additional light sources 64 are provided, which are arranged near a lateral edge of the light source 60. The additional light sources 64 are formed by light diodes. The lens 66 are associated with each of the light sources, so that the light emitted by the light sources passes through the lens and is bundled by it.

Figure 9:
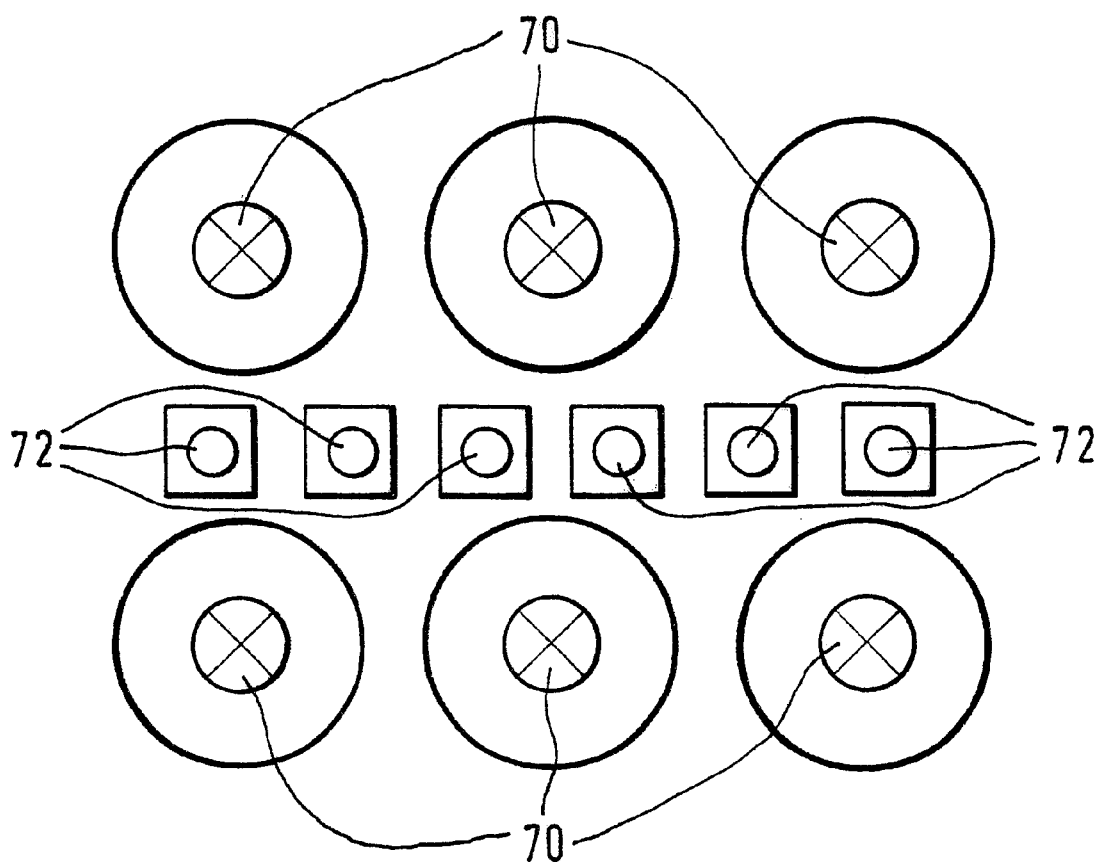
FIG. 9 is a view showing the illumination device in a front view in accordance with a fifth embodiment of the present invention.

The illumination device in accordance with a fifth embodiment is shown in FIG. 9. It has one or several light emitting elements 70 formed as incandescent lamps or semiconductor light sources, in particular light diodes. The light emitting elements 70 can be associated with reflectors and/or lenses. The light emitted by the light emitting elements 70 produces a uniform illumination intensity distribution which has no local high illumination intensities. It further has several additional, at least approximately punctual light sources 72. These additional light sources 72 can be formed as semiconductor light sources, in particular light diodes, or a smaller incandescent lamp. The additional light sources 72 can be associated with reflectors which reflect the light emitted by the light sources and/or with lenses through which the light emitted by the light sources can pass. The additional light sources 72 are offset relative to the light emitting elements 70. The light which is emitted by the light sources 72 is used for producing higher illumination intensity values in at least partial region of the illumination intensity distribution produced by the light which is emitted by the illumination device.

It will be understood that each of the elements described above, or two or more together, may also find a useful application in other types of constructions differing from the types described above.

While the invention has been illustrated and described as embodied in illumination device, in particular light for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. An illumination device formed as a light for a motor vehicle, comprising at least one light emitting element which emits a light producing an illumination intensity distribution having no pronounced maximum; and at least one additional light source which emits a light in addition to the light produced by said at least one light emitting element, and thereby higher illumination intensity value than an illumination intensity value produced by said at least one light emitting element is produced in at least one partial region of an illumination intensity distribution of a light exiting the illumination device.

2. An illumination device as defined in claim 1, wherein said at least one light emitting element is elongated so that light exits said light emitting element over its longitudinal extension in a distributed manner over at least one part.

3. An illumination device as defined in claim 1, wherein said at least one additional light source is at least substantially punctual.

4. An illumination device as defined in claim 1, wherein said at least one additional light source is a semiconductor light source.

5. An illumination device as defined in claim 4, wherein said semiconductor light source is a light diode.

6. An illumination device as defined in claim 1, wherein said at least one additional light source is an incandescent lamp.

7. An illumination device as defined in claim 1, wherein said at least one additional light source is provided with a reflector, by which light emitted by said additional light source is reflected.

8. An illumination device as defined in claim 1, wherein said at least one additional light source is provided with a lense through which light emitted by said additional light source passes.

9. An illumination device as defined in claim 1, wherein said additional light source is offset relative to said light emitting element.

10. An illumination device as defined in claim 1, wherein said at least one additional light source is arranged so that light emitted by said one additional light source passes through said light emitting element formed as a light guide.

11. An illumination device formed as a light for a motor vehicle, comprising at least one light emitting element which emits a light producing an illumination intensity distribution having no pronounced maximum; and at least one additional light source which simultaneously emits a light in addition to the light produced by said at least one light emitting element, and thereby higher illumination intensity value than an illumination intensity value produced by said at least one light emitting element is produced in at least one partial region of an illumination intensity distribution of a light exiting the illumination device.

* * * * *